(12) United States Patent
Darrah, Jr.

(10) Patent No.: US 11,577,610 B2
(45) Date of Patent: Feb. 14, 2023

(54) MULTI-FUNCTION ROTATIONAL SWITCH FOR VEHICLES

(71) Applicant: PACCAR Inc, Bellevue, WA (US)

(72) Inventor: Leslie Lee Darrah, Jr., Argyle, TX (US)

(73) Assignee: Paccar Inc, Bellevue, WA (US)

( * ) Notice: Subject to any disclaimer, the term of this patent is extended or adjusted under 35 U.S.C. 154(b) by 275 days.

(21) Appl. No.: 16/898,171

(22) Filed: Jun. 10, 2020

(65) Prior Publication Data
US 2021/0387526 A1    Dec. 16, 2021

(51) Int. Cl.
*B60K 37/06* (2006.01)
*B60Q 3/16* (2017.01)

(52) U.S. Cl.
CPC ............... *B60K 37/06* (2013.01); *B60Q 3/16* (2017.02); *B60K 2370/126* (2019.05); *B60K 2370/341* (2019.05); *B60K 2370/46* (2019.05); *B60K 2370/774* (2019.05)

(58) Field of Classification Search
CPC ...... B60Q 1/1453; B60Q 3/82; B60Q 1/0076; B60Q 3/16; B60K 37/06; B60K 2370/128; B60K 2370/1523; B60K 2370/126; B60K 2370/46; B60K 2370/341; B60K 2370/1537; B60K 2370/774
See application file for complete search history.

(56) References Cited

U.S. PATENT DOCUMENTS

2009/0079712 A1\* 3/2009 Levin ...................... G06F 3/016
345/184

\* cited by examiner

*Primary Examiner* — Yaron Cohen
(74) *Attorney, Agent, or Firm* — Seed Intellectual Property Law Group LLP

(57) ABSTRACT

Compact, multi-function rotational controllers or switches that allow an operator of a vehicle to simultaneously view the status of a plurality of related functions, and to easily change or toggle the status of each of the functions. A multi-function controller of the present disclosure may include a rotatable central control dial that is at least partially surrounded by a visual indicator panel that indicates a current status for the functions that are controlled by the multi-function controller. The multi-function controller may include a selected function indicator that indicates which of the plurality of related functions is currently selected, control input hardware that receives operator input, and control circuitry that toggles the state of the selected function responsive to such operator input. The multi-function controller may include an "all functions off" function that allows the operator to simultaneously turn all of the related functions off via a single input action.

17 Claims, 5 Drawing Sheets

MULTI-FUNCTION ROTATIONAL SWITCH FOR VEHICLES

BACKGROUND

Technical Field

The present disclosure generally relates to vehicle controls, and more particularly, to vehicle input controllers or switches that provide control of various vehicle functions.

Description of the Related Art

A vehicle, such as an automobile, a truck, a boat, an airplane, or the like, typically has several components, such as instruments, switches, dials, accessories, and controls mounted on an instrument panel or dashboard, and these components facilitate operation of the vehicle by an operator. The instrument panel typically supports several switches or the like in an aligned, preselected arrangement that allows the operator to see and access the switches while operating the vehicle.

The instrument panels in vehicles typically include a plurality of rocker switches or toggle switches that are connected to the electrical system of the vehicle and adapted to control different operations or functions of the vehicle, such as lamps, engine/axle functions, air controlled devices, accessories, or other functions or subsystems of the vehicle. The rocker switch assemblies and toggle switch assemblies may be arranged in one or more rows on the dashboard of a vehicle and, as a result, may occupy a relatively large amount of space on the dashboard. Additionally, with such switches spaced apart in one or more rows, the switches that are furthest from the operator may be somewhat difficult to reach while the operator is operating the vehicle.

Further, in some instances, the vehicle and its operator may experience a rough ride because of the uneven terrain, turbulence, or vibration. This rough ride makes it difficult for the operator to steady their hand relative to, for example, one or more of the switches mounted on the instrument panel. As a result, the operator's hand easily and involuntarily moves relative to the selected switch, thereby making it difficult to activate the switch while operating the vehicle. Further, such an uneven ride requires substantial concentration by the operator, and it is often difficult or impractical for the operator to take their eyes off of the road and focus on the series of switches to determine the location of a selected switch which the operator desires to manipulate. As a result, the operator often pokes or swipes at the switches. The rocker switch assemblies may not be sufficiently strong to withstand being swiped at and hit repeatedly throughout the life of the switch when an operator attempts to flip the switch to a selected position. Accordingly, conventional switches can experience a reduced life as a result of harsh treatment by an operator that occurs when driving in a high vibration environment.

A further drawback to the conventional instrument panels in vehicles is the positioning and alignment of the switches. When a driver is operating in a high vibration environment, as is typically encountered when driving a long-haul truck, it is difficult for the driver to quickly look away from the road and focus on the switches. As a result, often times a driver will continue watching the road while blindly stabbing or groping at the instrument panel in an attempt to find the desired switch. Such blind searching for the appropriate switch can be very frustrating and difficult, particularly when a driver is required to concentrate fully on the road. Therefore, the conventional instrument panels having rows of switches and other controls can be frustrating and difficult to use by the driver during operation of the vehicle without visually focusing on the specific switch to be manipulated at a selected time.

When the operator can and does look at the switches on the instrument panel, visual identification of each of the switches, and other components, is typically facilitated by individual lights behind each of the components. Accordingly, the conventional instrument panel requires a relatively large number of lights to provide sufficient illumination and identification of the switches, controls, and other components. Installation and assembly of the instrument panels with the large number of lights is a time-consuming process, and maintenance of such an instrument panel, including replacement of the individual lights, is a very labor-intensive and time-consuming process.

BRIEF SUMMARY

A multi-function controller positionable on a dashboard of a vehicle, the multi-function controller may be summarized as including a central control dial that is selectively rotatable about a rotation axis; control input hardware; a visual indicator panel that at least partially surrounds the central control dial, the visual indicator panel providing a visual indication of a plurality of related functions associated with a function group of the vehicle; and control circuitry operatively coupled to the central control dial, the control input hardware, and the visual indicator panel, the control circuitry configured to cause the visual indicator panel to simultaneously provide a selected function indicator that indicates which one of the plurality of related functions is currently selected for control by user actuation of the control input hardware; and a function status indicator for each of the plurality of related functions that indicates the current status of each of the plurality of related functions.

The control circuitry may be configured to receive input responsive to rotation of the central control dial, and vary which of the functions is selected by the selected function indicator responsive to the received input. The control circuitry may be configured to receive input responsive to user actuation of the control input hardware, and change the status of the function that is currently selected for control as indicated by the selected function indicator. The visual indicator panel may include an all functions off indicator and, responsive to receiving input from user actuation of the control input hardware while the all functions off indicator is selected as indicated by the selected function indicator, the control circuitry is configured to cause all of the plurality of related functions to turn off. The visual indicator panel may include at least one display panel including a plurality of pixels. The function group may include a function group relating to one of: lighting for the vehicle, engine or axle functions of the vehicle, or air controlled devices of the vehicle. The control input hardware may include a button positioned on the central control dial. The control input hardware may be actuated by a user applying a force to the central control dial. The control circuitry may be coupled to at least one controller of the vehicle via a multiplexed data bus.

A multi-function controller positionable on a dashboard of a vehicle, the multi-function controller may be summarized as including a central control dial that is selectively rotatable about a rotation axis; control input hardware; a visual indicator panel that at least partially surrounds the central control dial, the visual indicator panel providing a visual indication of a plurality of related functions associated with a function group of the vehicle; and control circuitry operatively coupled to the central control dial, the control input hardware, and the visual indicator panel, the control circuitry configured to cause the visual indicator panel to simultaneously provide a selected function indicator that indicates which one of the plurality of related functions is currently selected for control by user actuation of the control input hardware; and a function status indicator for each of the plurality of related functions that indicates the current status of each of the plurality of related functions; receive input responsive to rotation of the central control dial, and vary which of the functions is selected by the selected function indicator responsive to the received input; and receive input responsive to user actuation of the control input hardware, and change the status of the function that is currently selected for control as indicated by the selected function indicator.

The visual indicator panel may include an all functions off indicator and, responsive to receiving input from user actuation of the control input hardware while the all functions off indicator is selected as indicated by the selected function indicator, the control circuitry is configured to cause all of the plurality of related functions to turn off. The visual indicator panel may include a plurality of icons that each represent a different one of the related functions. The function group may include a function group associated with one of: lighting for the vehicle, engine or axle functions of the vehicle, or air controlled devices of the vehicle. The control input hardware may include a button positioned on the central control dial. The control input hardware may be actuated by a user applying a force to the central control dial.

A control input system may be summarized as including a plurality of multi-function controllers positionable on a dashboard of a vehicle, each of the multi-function controllers operative to provide control input for a plurality of functions associated with a function group of a respective plurality of function groups, each multi-function controller including a central control dial that is selectively rotatable about a rotation axis; control input hardware; a visual indicator panel that at least partially surrounds the central control dial, the visual indicator panel providing a visual indication of a plurality of related functions associated with a function group of the vehicle; and control circuitry operatively coupled to the central control dial, the control input hardware, and the visual indicator panel, the control circuitry configured to cause the visual indicator panel to simultaneously provide a selected function indicator that indicates which one of the plurality of related functions is currently selected for control by user actuation of the control input hardware; and a function status indicator for each of the plurality of related functions that indicates the current status of each of the plurality of related functions.

The plurality of multi-function controllers may include a first multi-function controller that controls lighting for the vehicle, a second multi-function controller that controls engine or axle functions of the vehicle, and a third multi-function controller that controls air controlled devices of the vehicle. For each multi-function controller, the control circuitry may be configured to receive input responsive to rotation of the central control dial, and vary which of the functions is selected by the selected function indicator responsive to the received input. For each multi-function controller, the control circuitry may be configured to receive input responsive to user actuation of the control input hardware, and change the status of the function that is currently selected for control as indicated by the selected function indicator. For each multi-function controller, the visual indicator panel may include an all functions off indicator and, responsive to receiving input from user actuation of the control input hardware while the all functions off indicator is selected as indicated by the selected function indicator, the control circuitry is configured to cause all of the plurality of related functions to turn off.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
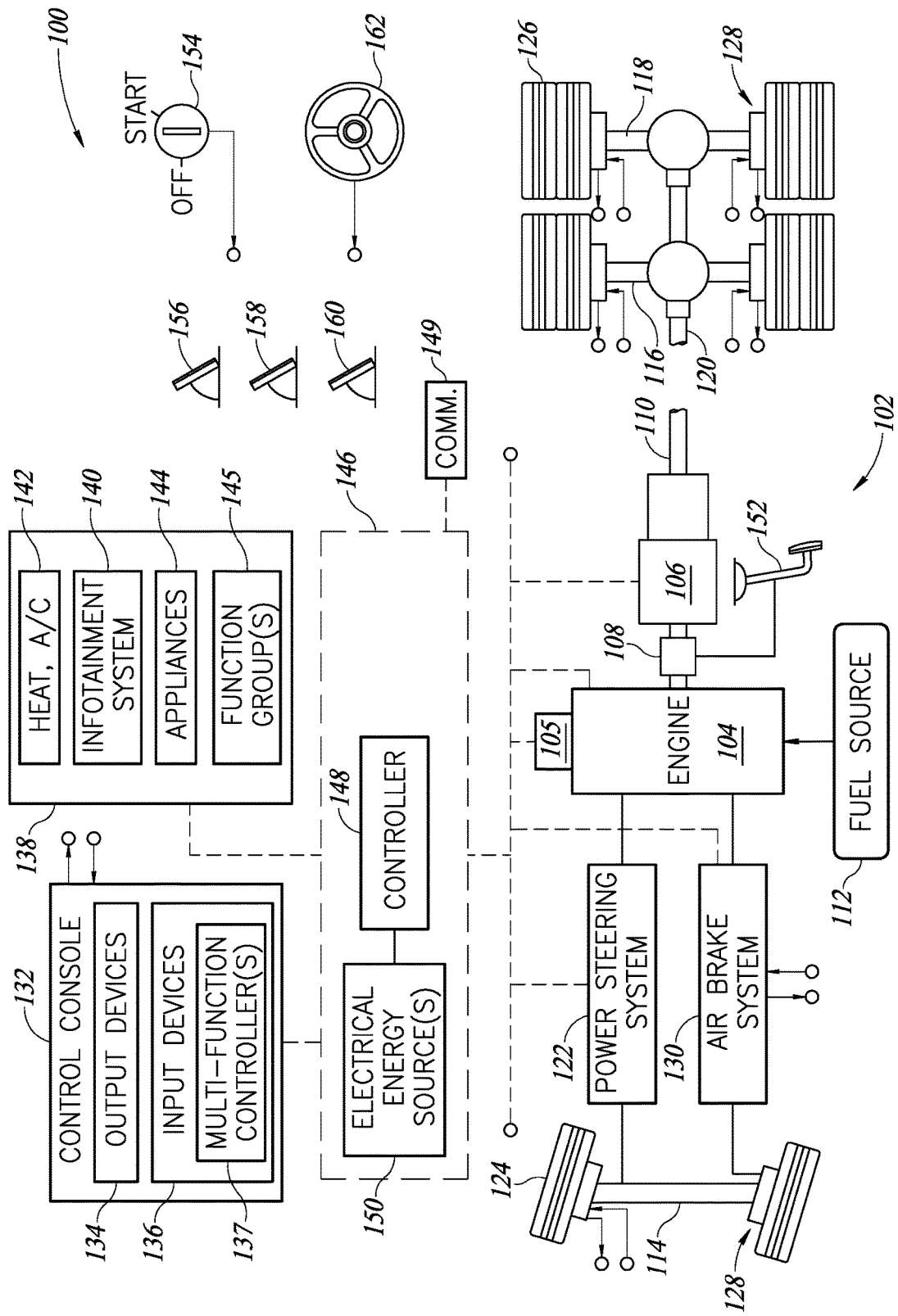
FIG. 1 is a schematic block diagram of a vehicle employing one or more multi-function controllers, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for controlling various functions of a vehicle via operator input. In at least some implementations, the systems and methods provide one or more compact, multi-function rotational switches that allow an operator to simultaneously view the status of a plurality of related functions, and to easily change or toggle the status of such functions. The systems and methods advantageously reduce or eliminate the number of dashboard rocker switches required, which reduces the cost and complexity of having multiple switches on the dashboard of a vehicle. In at least some implementations, the systems may include a plurality of multi-function rotational switches or controllers that each control a plurality of related functions of respective function groups of the vehicle. As a non-limiting example, three multi-function switches may be provided to control functions relating to vehicle lighting, functions relating to engine/axle functions, and functions relating to air operated accessories, respectively. In other implementations, fewer or more multi-function switches may be provided. By significantly reducing the amount of space required on the dashboard, the multi-function rotational switches of the present disclosure provide a cleaner and more modern dashboard appearance, while freeing available dashboard space for additional content or enabling a reduced sized dashboard. As another advantage, the multi-function rotational switches may be positioned in closer proximity to the operator, relative to linear rows of switches, which provides potential ergonomic and safety benefits.

The various features of the systems and methods of the present disclosure are discussed further below with reference to the figures. In particular, an example vehicle in which the multi-function rotational controllers or switches of the present disclosure may be implemented is initially discussed with reference to FIGS. 1 and 2. Then, various example implementations of multi-function rotational switches are discussed with reference to FIGS. 3-5.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, aircraft, etc. Accordingly, the following descriptions and illustrations herein should be considered illustrative in nature, and thus, not limiting the scope of the present disclosure.

As briefly described above, embodiments of the present disclosure are directed to multi-function controllers or switches suitable for use in a vehicle. FIG. 1 shows a schematic block diagram of a vehicle 100, such as a Class 8 tractor or other vehicle, which includes a powertrain system 102. In the embodiment shown in FIG. 1, the powertrain system 102 includes an engine 104 (e.g., internal combustion engine), a transmission 106, and a clutch assembly 108. The transmission 106 may be a manual transmission, an automated manual transmission, or an automatic transmission that includes multiple forward gears, neutral and a reverse gear operatively connected to an output shaft 110. The clutch assembly 108 may be positioned between the engine 104 and the transmission 106 to selectively engage/disengage the engine from the transmission. The clutch assembly 108 may be actuated manually, pneumatically, hydraulically, electrically, or via any other suitable mechanism. In operation, the engine 104 receives fuel from a fuel source 112 and converts the energy of the fuel into output torque. The output torque of the engine 104 is converted via the transmission 106 into rotation of the output shaft 110.

The vehicle 100 also includes at least two axles such as a steer axle 114 and at least one drive axle, such as axles 116 and 118. The output shaft 110 of the transmission 106, which may include a vehicle drive shaft 120, is drivingly coupled to the drive axles 116 and 118 for transmitting the output torque generated by the engine 104 to the drive axles 116 and 118. The steer axle 114 is operatively coupled to a power steering system 122. The power steering system 122 may be powered hydraulically by an engine-mounted pump as shown in FIG. 1 or an electrical pump, or the power steering system may be fully electrical with no direct connection to the engine 104. In at least one embodiment, the power steering system 122 includes an electrically driven steering pump or it may be directly driven with no pump. The steer axle 114 supports corresponding front wheels 124 and the drive axles 116 and 118 support corresponding rear wheels 126, each of the wheels having service brake components 128. In at least some embodiments, the service brake components 128 include air brake components of an air brake system 130, such as an electrically driven compressor, compressed air supply/return lines, brake chambers, etc. In at least some implementations, the brake system may include hydraulic brakes. In at least some implementations, the brake system may utilize electrical air compressors that are not connected to the engine 104, or brakes that are directly electrically actuated without a pneumatic system. The service brake components 128 may also include wheel speed sensors, electronically controlled pressure valves, and the like, to effect control of the vehicle braking system.

The vehicle 100 may further include a cab mounted operator interface, such as a control console 132, which may include any of a number of output devices 134, such as lights, graphical displays (e.g., liquid crystal display (LCD), light emitting diode (LED) display), buzzers, speakers, gages, and the like, and various input devices 136, such as one or more multi-function rotational controllers or switches 137, discussed in detail below with reference to FIGS. 3-5. The input devices 136 may also include digital inputs, touchscreens, toggle switches, push button switches, potentiometers, etc. The control console 132 may include multiple user interfaces, such as a first user interface in a front portion of the cab, such as a dashboard thereof, and a second user interface in a sleeper portion of the cab. As another example, for dual steer vehicles with left hand and right hand driving stations, the control console 132 may include instrument panels on both sides of the dashboard.

In at least some embodiments, the vehicle 100 may further include additional sub-systems 138 including an infotainment system 140, a heater and A/C system 142 (e.g., heater, A/C system, auxiliary A/C system), other appliances 144, such as a microwave, a coffee maker, television, electrical outlets for laptops, USB inputs, etc., and one or more additional functional groups 145. In at least some embodiments, the vehicle 100 may include a navigational device having GPS or other location capability, CD/DVD or other audio/visual functionality.

As non-limiting examples, the functional groups 145 may include functions such as lighting for the vehicle, engine/axle functions, air operated accessories, trailer functions, suspension functions, brake functions, power take-off (PTO) functions, etc.

The vehicle 100 may include one or more wired or wireless communications systems 149, including radio frequency (RF) or infrared (IR) based communication links. The communications capabilities may include but are not limited to Universal Serial Bus (USB), 802.x (e.g., 802.11, 802.15, 802.16, etc.), cellular, dedicated short-range communications (DSRC), Bluetooth®/nearfield protocols, among others.

In order to start the engine 104, and to provide power to the control console 132 and other systems 138, etc., the vehicle 100 also includes a power system 146, also referred to herein as a power and control system 146. The power system 146 in at least one embodiment includes a controller module or controller 148 and a rechargeable electrical energy source 150. The controller 148 may be operatively coupled to the various systems of the vehicle including, but not limited to the electrical energy source(s) 150, the engine 104, the transmission 106, the power steering system 122, the alternator 105, the communications system 149, the control console 132, the systems 138, the brake system 130, etc.

The electrical energy source 150 may include electrical energy storage in the form of one or more batteries, one or more capacitors, one or more fuel cells, combinations thereof, etc. The batteries can be of the lead acid, NiCd, Lithium-ion type or can include any currently known or future developed rechargeable battery technology. The batteries may include starting batteries, deep cycle batteries, combinations thereof, etc. In at least some embodiments, the power system 146 may include one or more primary batteries for starting the engine and one or more auxiliary batteries for providing power to other loads during engine on and engine off conditions. In such embodiments, the auxiliary batteries may be combined with capacitors, fuel cells, electric power converters, etc., to provide power as needed. The batteries and systems may operate at one or more of a number of different voltage levels including, but not limited to, 12 V, 24 V, 48 V, 350 V, 650 V, etc.

The power system 146 of the vehicle 100 may also include one or more DC/DC converters to supply direct current to any suitable DC load or to interconnect and balance multiple energy sources, and may optionally include one or more inverters to supply alternating current to any suitable AC loads. In at least some embodiments, the DC/DC converter reduces or increases the voltage it receives from electrical energy source 150, and outputs power at this lower or increased voltage to the appropriate loads. The DC/DC converter or inverter can output power to other electrical devices on the vehicle 100, including electric pumps, electric compressors, of the air brake system 130, the power steering system 122, or other vehicle systems, such as an electric PTO, etc., as will be described in more detail below. To aid in the distribution of power, additional components may be used, which are not shown but well known in the art, including distribution blocks, distribution panels, fuse blocks, relays, contactors and/or the like.

The vehicle 100 may also include conventional operator control inputs, such as a clutch pedal 152 (in some manual systems), an ignition or start switch 154, a throttle or an accelerator pedal 156, a service brake pedal 158, a parking brake 160 and a steering wheel 162 to effect turning of the front wheels 124 and/or wheels on other axles of the vehicle 100.

While the vehicle 100 of FIG. 1 may employ a powertrain utilizing an internal combustion engine as the vehicle motive force, the vehicle represents only one of the many possible applications for the systems and methods of the present disclosure. It should be appreciated that aspects of the present disclosure transcend any particular type of land, air or marine vehicle and any type of powertrain. For example, the vehicle 100 may employ a hybrid powertrain with the prime mover a combustion engine, fuel cell stack, etc.

Figure 2:
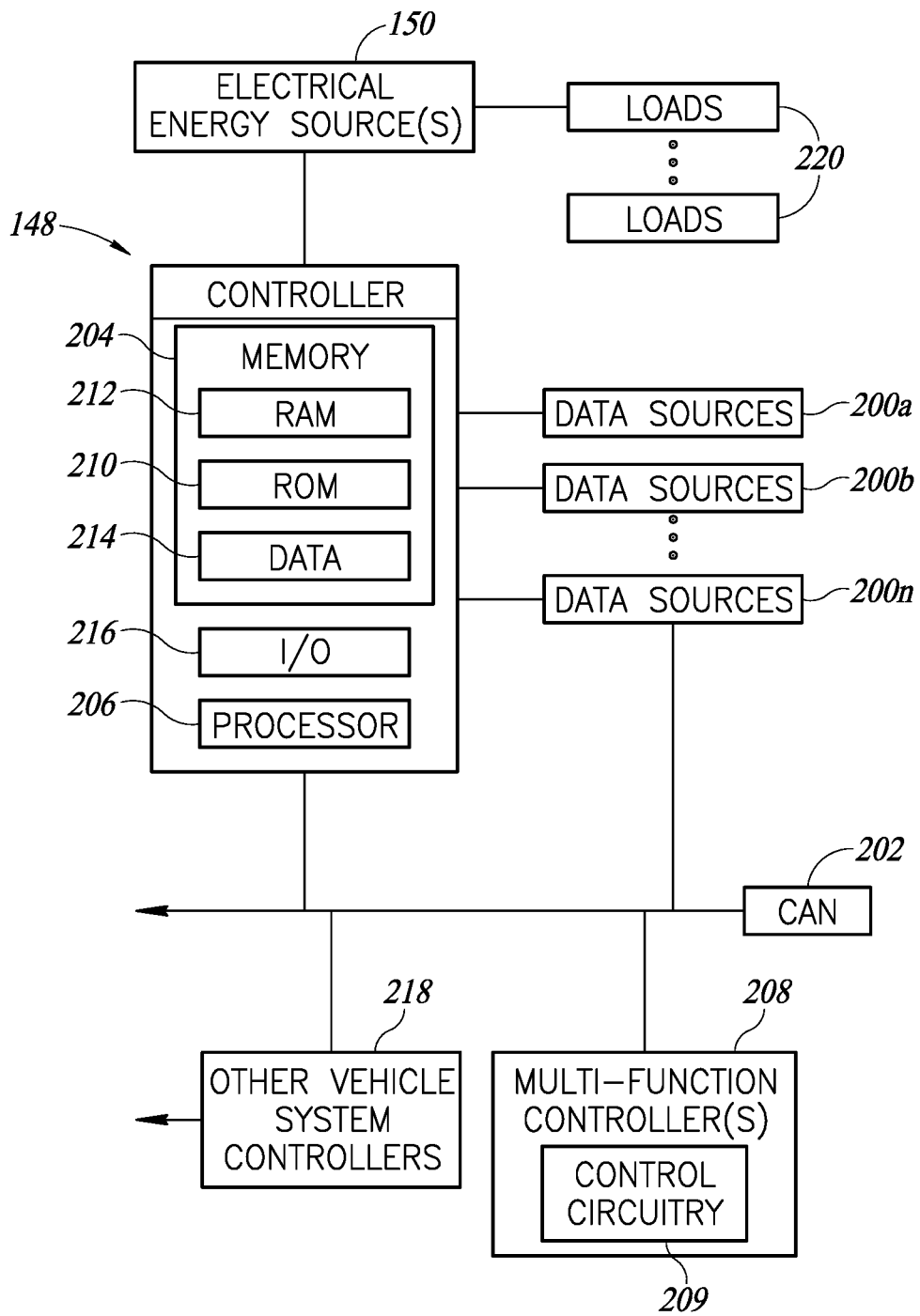
FIG. 2 is a schematic block diagram of a control system for a vehicle that includes one or more multi-function controllers, according to one non-limiting illustrated implementation.

FIG. 2 shows one non-limiting example of the controller 148 formed in accordance with aspects of the present disclosure. The controller 148 is connected in electrical communication with a plurality of data sources 200a-200n (generally, data sources 200). As will be described in more detail below, the data sources 200 may include but are not limited to navigation equipment, communications devices, on-board sensors, on-board state estimators, etc. It will be appreciated that the controller 148 can be connected directly (wired or wirelessly) to the plurality of data sources 200 or indirectly via any suitable interface, such as a CAN interface 202 or other interface. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 100 via the CAN 202 or other interface for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, one or more multi-function controllers 208 that include control circuitry 209, etc. The multi-function controller 208 may be similar or identical to the multi-function controller 137 shown in FIG. 1.

In operation, as will be described in more detail below, the controller 148 receives signals from the data sources 200, processes such signals and others, and depending on the processed signals, transmits suitable control signals for operating the engine 104, the alternator 105, the power system 146, or other components of the vehicle 100. The controller 148 initiates operation by means of a hard wired input (e.g. ignition key 154) or by receiving a signal from a communication network (e.g. wake-up on CAN). This wake-up message allows to bring the controller 148 in operation, whereas the operator does not need to use the ignition keys or be physically in or near the vehicle 100. The controller 148 may be a standalone controller or may be part of one or more other controllers (e.g., vehicle electronic control unit (VECU)) of the vehicle 100. Generally, the implementations of the present disclosure may utilize one or more local or remote controllers operative to provide the functionality described herein.

In at least some embodiments, the controller 148 may contain logic implemented in a variety of combinations of hardware circuitry components and programmed processors to effect control of the power system 146 and other systems of the vehicle 100. To that end, as further illustrated in FIG. 2, one suitable embodiment of the controller 148 includes control circuitry that includes a nontransitory memory 204 and a processor 206. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits or control circuitry, combinations of the above, among others. In at least one embodiment, the processor 206 executes instructions stored in memory 204 to implement the functionality described in the present disclosure.

The one or more multi-function controllers 208 may include control circuitry 209, which may include one or more processors, memory, I/O components, etc., as discussed above with reference to the controller 148. The multi-function controllers 208 may be considered as one of the data sources 200 that provide control input to one or more controllers of the vehicle, in at least some implementations.

The control circuitry 209 of the multi-function controllers 208 may include a set of control instructions, including program instructions, selectable parameters, etc., stored in one of the storage media and executed to provide functions described herein. Information transfer to and from the multi-function controllers 208 may be accomplished by way of a direct connection, a local area network bus (e.g., multiplexed data bus 202), a serial peripheral interface bus, wired or wireless interfaces, etc.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements some or all of the functionality described herein. However, it should be appreciated that the controller 148 may be a controller module, which could be software embedded within an existing on-board controller, such as the engine controller, a general purpose controller, other vehicle system controllers, one or more local or remote controllers, etc.

As briefly described above, the data sources 200 can include but are not limited to the multi-function controllers 208, on-board sensors, navigation/GPS devices, communications devices, data stores, remote servers, etc. These data sources and others in at least some embodiments may be part of the systems 138, control console 132, etc., described above with reference to FIG. 1. The data supplied from these data sources 200 and others may generally or specifically relate to vehicle operating parameters, status information, control information, etc.

Figure 3:
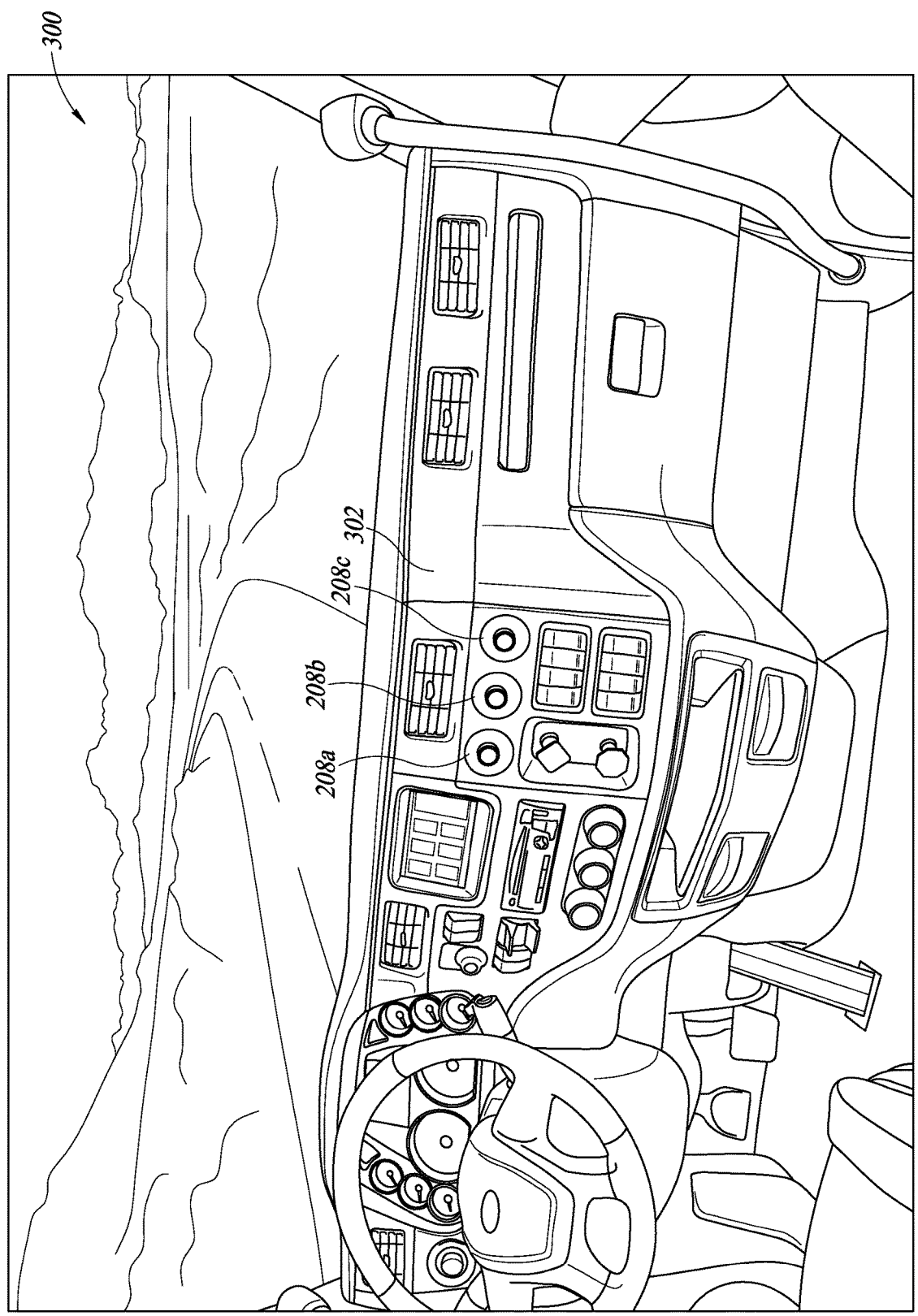
FIG. 3 is a pictorial diagram that depicts a dashboard of a vehicle that includes three multi-function rotational controllers, according to one non-limiting illustrated implementation.

FIG. 3 is a pictorial diagram 300 that depicts an example dashboard 302 of a vehicle that includes three multi-function rotational controllers 208a, 208b, and 208c ("multi-function controllers 208") which may similar or identical to the multi-function controllers 137 and 208 shown in FIGS. 1 and 2, respectively, and discussed above. FIG. 4 is a pictorial diagram 400 that shows an enlarged view of the three multi-function rotational controllers 208 shown in FIG. 3. In FIG. 4, respective components of the multi-function controllers 208a, 208b, and 208c are designated with the letters 'a,' 'b,' and 'c,' respectively. Although shown as being in a horizontal row on the dashboard 302 of the vehicle in the illustrated implementation, the multi-function controllers 208 may be positioned at any desired location and orientation in the vehicle where they are reachable by an operator or passenger. Further, although three multi-function controllers 208 are illustrated, in other implementations fewer (e.g., one, two) or more (e.g., five, ten) multi-function controllers may be provided in a vehicle.

Figure 4:
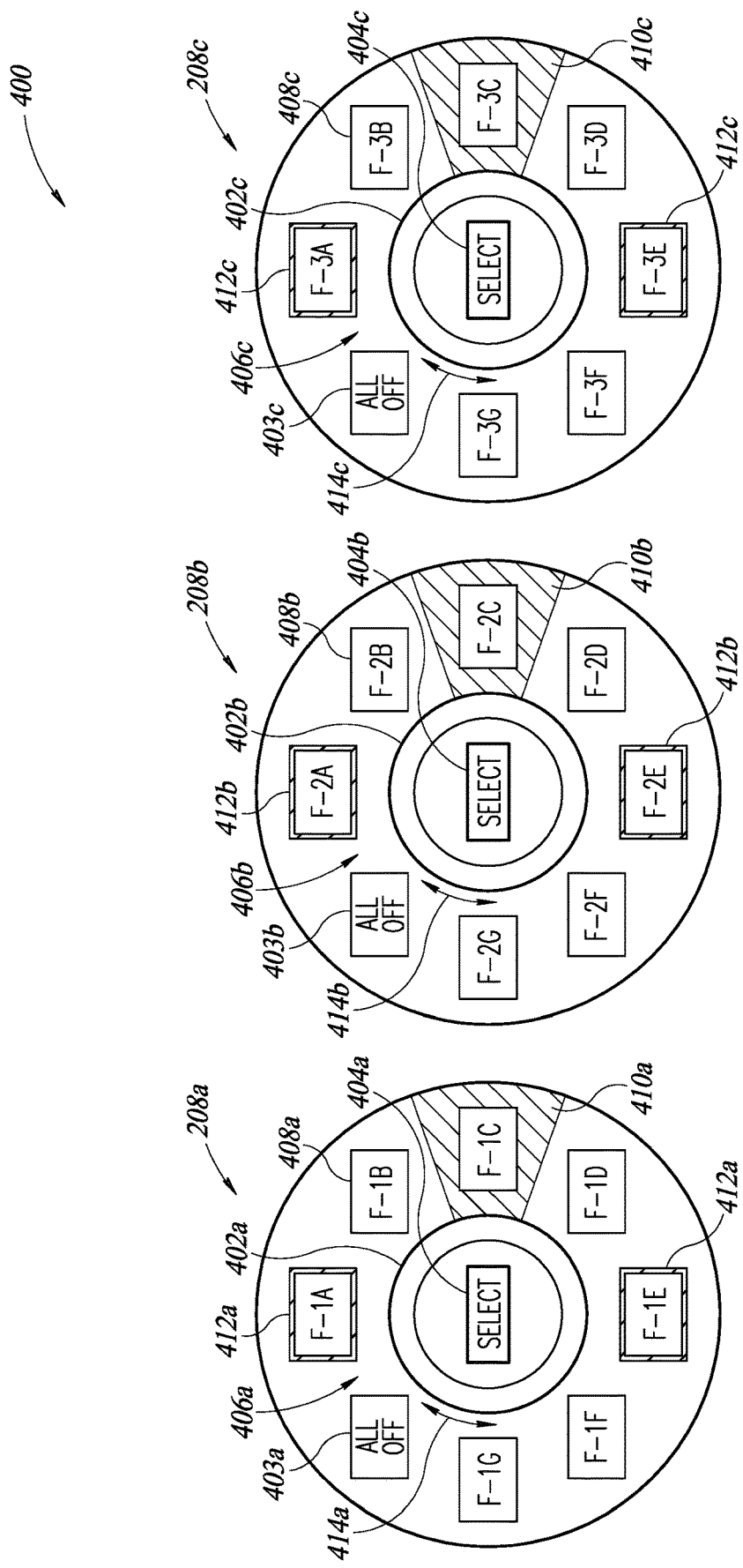
FIG. 4 is a pictorial diagram that shows an enlarged view of the three multi-function rotational controllers shown in FIG. 3, according to one non-limiting illustrated implementation.

As shown best in FIG. 4, each of the multi-function controllers 208 include a central control dial 402 that is selectively rotatable (as indicated by an arrow 414) about a central rotation axis that is perpendicular to the plane in which the arrow 414 lies (i.e., perpendicular to the page as shown in FIG. 4). The multi-function controllers 208 each include control input hardware 404 that is operative to receive control input from an operator, and a visual indicator panel 406 that at least partially surrounds the central control dial 402. The control input hardware 404 may include a button positioned on the central control dial 402, such as the illustrated button that includes the text "SELECT" as an indication to the operator. Additionally or alternatively, the control input hardware 404 may include hardware that receives input responsive to the central control dial being actuated (e.g., pressed, clicked) by a user applying a force to the central control dial. More generally, the control input hardware may include any mechanical, electronic, or other type of hardware that is capable of receiving input from the operator.

The visual indicator panel 406 provides a visual indication of a plurality of related functions associated with a function group of the vehicle. As an example, the visual indicator panel 406 may include one or more pixel-based displays (e.g., LCD, LED), one or more backlit icons, etc. The visual indicator panel 406 may include content that represents each of the plurality of related functions controlled by the respective multi-function controller 208. The content may include visual content (e.g., graphics, icons), textual content (e.g., "FLOOD LIGHTS"), or both.

In the illustrated implementation, the multi-function controller 208a may be operative to control related functions F-1A to F-1G of a first functional group F-1, the multi-function controller 208b may be operative to control related functions F-2A to F-2G of a second functional group F-2, and the multi-function controller 208c may be operative to control related functions F-3A to F-3G of a third functional group F-3. In the illustrated example, each of the multi-function controllers 208 control seven related functions (e.g., functions F-1A to F-1G), but in other implementations one or more of the multi-function controllers 208 may each control fewer or more related functions.

As discussed above, the multi-function controllers 208 may each include control circuitry, such as control circuitry 209 shown in FIG. 2, that is operatively coupled to the central control dial 402, the control input hardware 404, and the visual indicator panel 406. The control circuitry may be coupled to one or more controllers of the vehicle via a suitable data communication medium (e.g., multiplexed data bus), as discussed above. In at least some implementations, control circuitry (e.g., one controller) may be provided that controls multiple multi-function controllers 208. The control circuitry may be physically located proximate the central control dial 402, the control input hardware 404, and the visual indicator panel 406, such as located within a housing of the multi-function controller 208, or may be located remotely from such components.

In operation, the control circuitry causes the visual indicator panel 406 to provide a selected function indicator 410a that indicates which one of the plurality of related functions 408 (e.g., functions F-1A to F-1G of the multi-function controller 208a) is currently selected for control by user actuation of the control input hardware 404. In the illustrated example, the selected function indicator 410a of the multi-function controller 208a indicates that the function F-1C is currently selected. Similarly, the selected function indicator 410b of the multi-function controller 208b indicates that the function F-2C is currently selected, and the selected function indicator 410c of the multi-function controller 208c indicates that the function F-3C is currently selected.

The control circuitry may also provide a function status indicator 412 for each of the plurality of related functions 408 that indicates the current status of each of the plurality of related functions. In the illustrated example, the function status indicators 412 each include a highlighted border surrounding each function that is enabled, and functions that are disabled or inactive do not include highlighted border. The function status indicators 412 may be any type of indicator that provides a visual cue to the operator that indicates the current status of each of the functions of the multi-function controllers 208. Example visual cues include lighting effects, color effects, text indicators, graphical indicators, animations, etc.

In operation, the control circuitry receives input from the central control dial 402 responsive to rotation thereof by the operator, and varies which of the related functions 408 is selected by the selected function indicator 410 responsive to the received input. For example, as the operator rotates the central control dial 402a of the multi-function controller 208a clockwise, the selected function indicator 410a moves from indicating the function F-1C is selected to indicating the function F-1D is selected, then to indicating the function F-1E is selected, and so on. Similarly, as the operator rotates the central control dial 402a counterclockwise, the selected function indicator 410a moves from indicating the function F-1C is selected to indicating the function F-1B is selected, then to indicating the function F-1A is selected, and so on.

The control circuitry receives input responsive to user actuation of the control input hardware 404 and, responsive to such input, changes the status of the function 408 that is currently selected for control as indicated by the selected function indicator 410. For example, upon actuation of the control input hardware 404, the control circuitry may cause a selected function that is in a disabled or "off" state to transition into an enabled or "on" state. Similarly, the control circuitry may cause a selected function that is currently enabled or "on" to transition into a disabled or "off" state upon actuation of the control input hardware 404.

In at least some implementations, each of the multi-function controllers 208 may include an "all functions off" indicator 403 operative to quickly turn off all of the functions controlled by the multi-function controller via a single input action. In particular, responsive to receiving input from user actuation of the control input hardware 404 while the all functions off indicator 403a is selected as indicated by the selected function indicator 410, the control circuitry may be configured to cause all of the plurality of related functions of the multi-function controller 208 to turn off. This feature advantageously allows the operator to simultaneously turn off a plurality of related functions instead of having to manually turn off each function separately.

Figure 5:
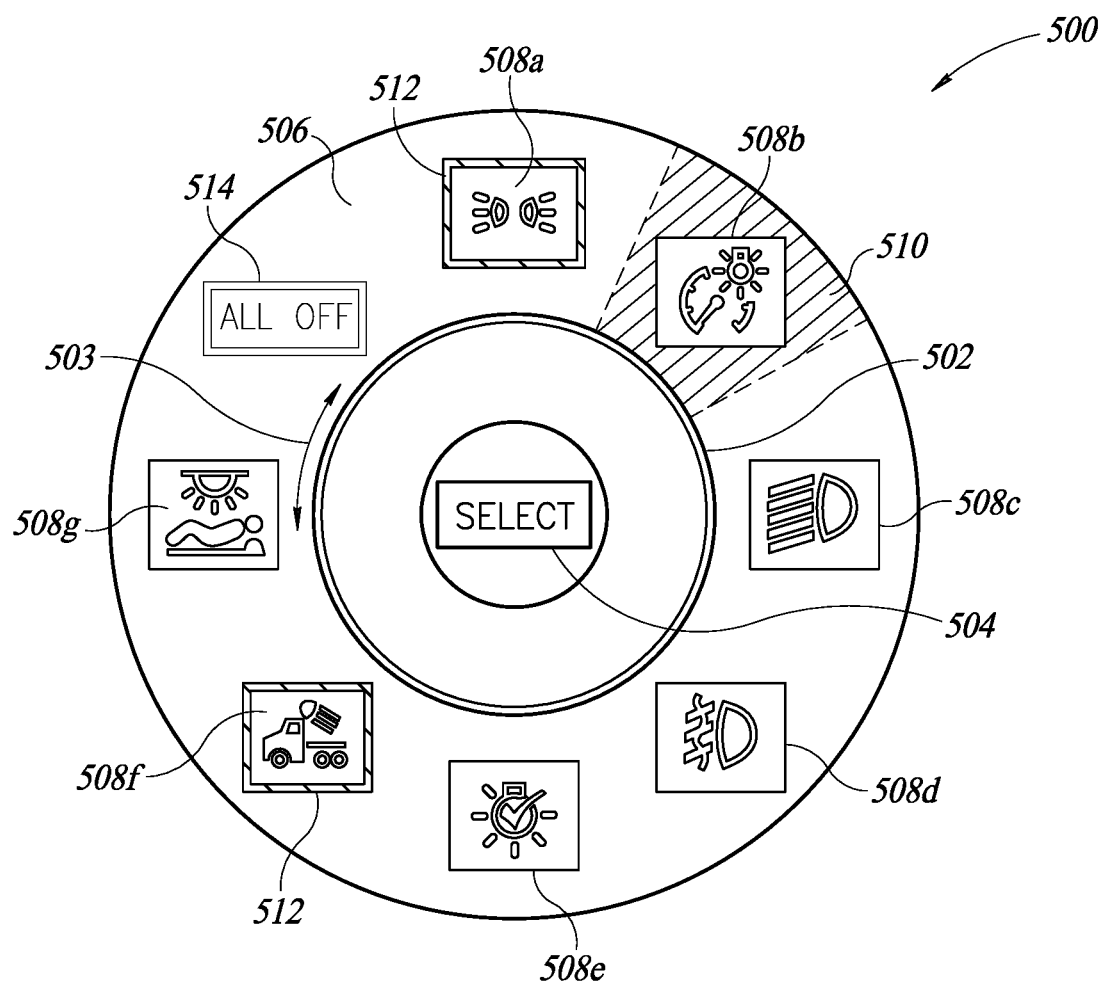
FIG. 5 is a diagram of an example multi-function rotational controller that is operative to control a plurality of lighting functions of a vehicle, according to one non-limiting illustrated implementation.

FIG. 5 is a diagram of an example multi-function rotational controller 500 that is operative to control a plurality lighting functions of a vehicle. As discussed above, other multi-function controllers may provide functionality for different related functions of a vehicle, such as engine/axle functions, air controlled features, etc. The multi-function controller 500 may be similar or identical to the multi-function controllers 137 and 208 discussed above with reference to FIGS. 1-4. Accordingly, some or all of the functionality discussed elsewhere herein applies to the multi-function controller 500, and may not be repeated below in the interest of brevity.

The multi-function controller 500 includes a central control dial 502 that is selectively rotatable (as indicated by an arrow 503) about a central rotation axis that is perpendicular to the plane in which the arrow 503 lies (i.e., perpendicular to the page as shown in FIG. 5). The multi-function controller 500 includes control input hardware 504 that is operative to receive control input from an operator, and a visual indicator panel 506 that at least partially surrounds the central control dial 502. The control input hardware 504 may include a button positioned on the central control dial 502, such as the illustrated button that includes "SELECT," or may include other input hardware operative to receive selection input from an operator.

The visual indicator panel 506 provides a visual indication of a plurality of lighting related functions of a vehicle. As an example, the visual indicator panel 506 may include one or more pixel-based displays (e.g., LCD, LED), one or more backlit icons, etc. As shown, the visual indicator panel 506 may include content that represents each of the plurality of related lighting functions controlled by the multi-function controller 500. The content may include visual content (e.g., graphics), textual content (e.g., "FLOOD LIGHTS"), or both.

In the illustrated implementation, the multi-function controller 500 may be used to control the following related lighting functions: auxiliary lights 508a, cab lights 508b, headlights 508c, fog lights 508d, exterior lights self-test 508e, flood lights 508f, and sleeper cab lights 508g. For each of these functions 508a-508g, the visual indicator panel 506 includes a graphical icon representative of the function that is easily recognizable by the operator with a quick glance of the multi-function controller 500 while operating the vehicle. In the illustrated example, the multi-function controller 500 controls seven related lighting functions 508a-508g, but in other implementations the multi-function controller may control fewer or more related functions.

The multi-function controller 508 may include control circuitry, such as control circuitry 209 shown in FIG. 2, that is operatively coupled to the central control dial 502, the control input hardware 504, and the visual indicator panel 506. In operation, the control circuitry causes the visual indicator panel 506 to provide a selected function indicator 510 that indicates which one of the plurality of related functions 508a-508g is currently selected for control by user actuation of the control input hardware 504. In the illustrated example, the selected function indicator 510 of the multi-function controller 500 indicates that the cab lights function 508b is currently selected.

The control circuitry may also provide function status indicators 512 for each of the plurality of related functions 508 that indicates the current status of each of the plurality of related functions. In the illustrated example, the function status indicators 512 each include a highlighted border surrounding each function that is enabled, and functions that are disabled or inactive do not include highlighted border. The function status indicators 512 may be any type of indicator that provides a visual cue to the operator regarding the status of each of the functions 508a-508g.

In operation, the control circuitry receives input responsive to rotation of the central control dial 502 by the operator, and varies which of the related functions 508a-508g is selected by the selected function indicator 510 responsive to the received input. The control circuitry receives input responsive to user actuation of the control input hardware 504 and, responsive to such input, changes the status of the function 508 that is currently selected for control as indicated by the selected function indicator 510. For example, upon actuation of the control input hardware 504 when the selected function indicator 510 is highlighting the cab lights function 508b, the control circuitry may cause the cab lights of the vehicle to switch from the off state to the on state, or vice versa.

In at least some implementations, the multi-function controller 500 may include an "all functions off" indicator 514 operative to quickly turn off all of the lighting functions 508a-508g controlled by the multi-function controller. In particular, responsive to receiving input from user actuation of the control input hardware 504 while the all functions off indicator 514 is selected as indicated by the selected function indicator 510, the control circuitry may be configured to cause all of the lighting functions 508a-508g controlled by the multi-function controller 500 to turn off. This feature advantageously allows the operator to simultaneously turn off a plurality of related functions instead of having to manually turn off each function separately.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A multi-function controller positionable on a dashboard of a vehicle, the multi-function controller comprising:
   a central control dial that is selectively rotatable about a rotation axis;
   control input hardware;
   a visual indicator panel that radially surrounds the central control dial, the visual indicator panel providing a visual indication of a plurality of related functions associated with a function group of the vehicle, including an all functions off indicator; and control circuitry operatively coupled to the central control dial, the control input hardware, and the visual indicator panel, the control circuitry configured to:
cause the visual indicator panel to simultaneously provide:
a selected function indicator that indicates which one of the plurality of related functions is currently selected for control by user actuation of the control input hardware; and
a function status indicator for each of the plurality of related functions that indicates the current status of each of the plurality of related functions; and
cause all of the plurality of related functions associated with the function group of a vehicle to turn off in response to user actuation of the control input hardware while the all functions off indicator is selected as indicated by the selected function indicator.

2. The multi-function controller of claim 1 wherein the control circuitry is configured to receive input responsive to rotation of the central control dial, and vary which of the functions is selected by the selected function indicator responsive to the received input.

3. The multi-function controller of claim 1 wherein the control circuitry is configured to receive input responsive to user actuation of the control input hardware, and change the status of the function that is currently selected for control as indicated by the selected function indicator.

4. The multi-function controller of claim 1 wherein the visual indicator panel comprises at least one display panel comprising a plurality of pixels.

5. The multi-function controller of claim 1 wherein the function group comprises a function group relating to one of: lighting for the vehicle, engine or axle functions of the vehicle, or air controlled devices of the vehicle.

6. The multi-function controller of claim 1 wherein the control input hardware comprises a button positioned on the central control dial.

7. The multi-function controller of claim 1 wherein the control input hardware is actuated by a user applying a force to the central control dial.

8. The multi-function controller of claim 1, wherein the control circuitry is coupled to at least one controller of the vehicle via a multiplexed data bus.

9. A multi-function controller positionable on a dashboard of a vehicle, the multi-function controller comprising:
a central control dial that is selectively rotatable about a rotation axis;
control input hardware;
a visual indicator panel that radially surrounds the central control dial, the visual indicator panel providing a visual indication of a plurality of related functions associated with a function group of the vehicle, including an all functions off indicator; and
control circuitry operatively coupled to the central control dial, the control input hardware, and the visual indicator panel, the control circuitry configured to:
cause the visual indicator panel to simultaneously provide:
a selected function indicator that indicates which one of the plurality of related functions is currently selected for control by user actuation of the control input hardware; and
a function status indicator for each of the plurality of related functions that indicates the current status of each of the plurality of related functions;

receive input responsive to rotation of the central control dial, and vary which of the functions is selected by the selected function indicator responsive to the received input;
receive input responsive to user actuation of the control input hardware, and change the status of the function that is currently selected for control as indicated by the selected function indicator; and
cause all of the plurality of related functions associated with the function group of a vehicle to turn off in response to user actuation of the control input hardware while the all functions off indicator is selected as indicated by the selected function indicator.

10. The multi-function controller of claim 9 wherein the visual indicator panel comprises a plurality of icons that each represent a different one of the related functions.

11. The multi-function controller of claim 9 wherein the function group comprises a function group associated with one of: lighting for the vehicle, engine or axle functions of the vehicle, or air controlled devices of the vehicle.

12. The multi-function controller of claim 9 wherein the control input hardware comprises a button positioned on the central control dial.

13. The multi-function controller of claim 9 wherein the control input hardware is actuated by a user applying a force to the central control dial.

14. A control input system, comprising: a plurality of multi-function controllers positionable on a dashboard of a vehicle, each of the multi-function controllers operative to provide control input for a plurality of functions associated with a function group of a respective plurality of function groups, including an all functions off indicator, each multi-function controller comprising: a central control dial that is selectively rotatable about a rotation axis; control input hardware; a visual indicator panel that radially surrounds the central control dial, the visual indicator panel providing a visual indication of a plurality of related functions associated with a function group of the vehicle; and control circuitry operatively coupled to the central control dial, the control input hardware, and the visual indicator panel, the control circuitry configured to: cause the visual indicator panel to simultaneously provide: a selected function indicator that indicates which one of the plurality of related functions is currently selected for control by user actuation of the control input hardware; and a function status indicator for each of the plurality of related functions that indicates the current status of each of the plurality of related functions; and cause all of the plurality of related functions associated with the function group of a vehicle to turn off in response to user actuation of the control input hardware while the all functions off indicator is selected as indicated by the selected function indicator.

15. The control input system of claim 14, wherein the plurality of multi-function controllers comprise a first multi-function controller that controls lighting for the vehicle, a second multi-function controller that controls engine or axle functions of the vehicle, and a third multi-function controller that controls air controlled devices of the vehicle.

16. The control input system of claim 14 wherein, for each multi-function controller, the control circuitry is configured to receive input responsive to rotation of the central control dial, and vary which of the functions is selected by the selected function indicator responsive to the received input.

17. The control input system of claim 14 wherein, for each multi-function controller, the control circuitry is configured to receive input responsive to user actuation of the control input hardware, and change the status of the function that is currently selected for control as indicated by the selected function indicator.

\* \* \* \* \*